United States Patent

[11] 3,612,388

| [72] | Inventors | Howard W. Wegener<br>Rte. 2, Box 91, Wilton, N.H. 03006;<br>Kenneth G. Boynton, Osgood Road,<br>Milford, N.H. 03055 |
|---|---|---|
| [21] | Appl. No. | 815,970 |
| [22] | Filed | Apr. 14, 1969 |
| [45] | Patented | Oct. 12, 1971 |

[54] MASS SOLDERING MACHINES
4 Claims, 2 Drawing Figs.

| [52] | U.S. Cl. | 228/34, 118/259, 228/36, 228/37 |
|---|---|---|
| [51] | Int. Cl. | B23k 1/00, B23k 5/22 |
| [50] | Field of Search | 228/34, 35, 36, 37; 29/503; 118/259, 400 |

[56] References Cited
UNITED STATES PATENTS

| 3,452,916 | 7/1969 | Andis | 228/36 |
| 3,398,873 | 8/1968 | Wegener et al. | 228/37 |
| 3,303,983 | 2/1967 | Patrick et al. | 29/503 X |
| 3,190,527 | 6/1965 | Tardoskegyi | 228/37 |
| 3,058,441 | 10/1962 | Walker et al. | 113/126 |
| 3,037,274 | 6/1962 | Hancock | 29/471.1 |

*Primary Examiner*—John F. Campbell
*Assistant Examiner*—R. J. Craig
*Attorney*—Aaron Feinberg ABSTRACT: An apparatus which eliminates the formulation of hot solder dross in the operation of an automatic mass soldering machine of the type which produces a high vertical wave of solder alone or solder and oil and having a horizontal crest.

INVENTORS.
H. W. WEGENER and
K. G. BOYNTON
BY Aaron Feinberg
ATTORNEY.

MASS SOLDERING MACHINES

This invention relates to mass soldering machines and more particularly to sumps, nozzles, sluices and oil supplies and controls used in the operation of such a machine.

This invention is an improvement on our patent described and claimed in U.S. Pat. No. 3,398,873 issued Aug. 27, 1968.

In present machines using in its soldering wave a regulated mixture of oil and solder stored in a main reservoir of solder with a layer of oil floating on top of the solder, great difficulty is experienced by the waterfall action of heavy solder from the vertical nozzles of the machine splashing directly into the top layer of oil. This caused the floating oil to be churned up and become filled with air bubbles producing objectionable foam. This undesirable feature was eliminated by the aforesaid U. S. Pat. No. 3,398,873.

The soldering procedure based on the oil intermix principle cannot be effectively used by those manufacturers engaged in soldering printed circuit boards who are unable to clean their printed boards after soldering. This is particularly true of radio and television manufacturers using fragile components which could be damaged in the cleaning process.

When it is required to use solder alone in the present machine and the oil supply is shut off from the pump which supplies the sump and nozzle, a problem arises in that dross will form in the sluice plate areas of the sump of the machine.

This dross will carry through the machine and deposit within the sump and on the baffle plates positioned therein causing many soldering problems and high maintenance costs.

It is the object of this invention to produce a soldering machine which will discharge from the nozzle of a machine of this type, a high vertical wave with a smooth horizontal crest of solder alone without oil, which solder, after contact with the objects to be soldered, will discharge into laterally positioned exterior sluice areas and will eliminate the formation and accumulation of dross on the top surface of said discharged solder, such dross being extremely harmful to a reliable and efficient soldering operation unless otherwise removed.

In accordance with this invention there is produced a mass soldering machine which is reliable and efficient. It is versatile and adapted for dual operation as it can produce waves of varying amounts of solder and oil or solder alone interchangeably, depending on the requirements of the final product. This can be accomplished readily and quickly by the operation of control valves. It reduces the cleaning and maintenance problems now associated with the operation when solder alone is used without an oil intermix as it eliminates the formation of dross on the solder overflow after the soldering contact.

Other objects and a fuller understanding of the invention will hereinafter appear from the following description of a preferred embodiment illustrative of the invention in which.

Figure 1:
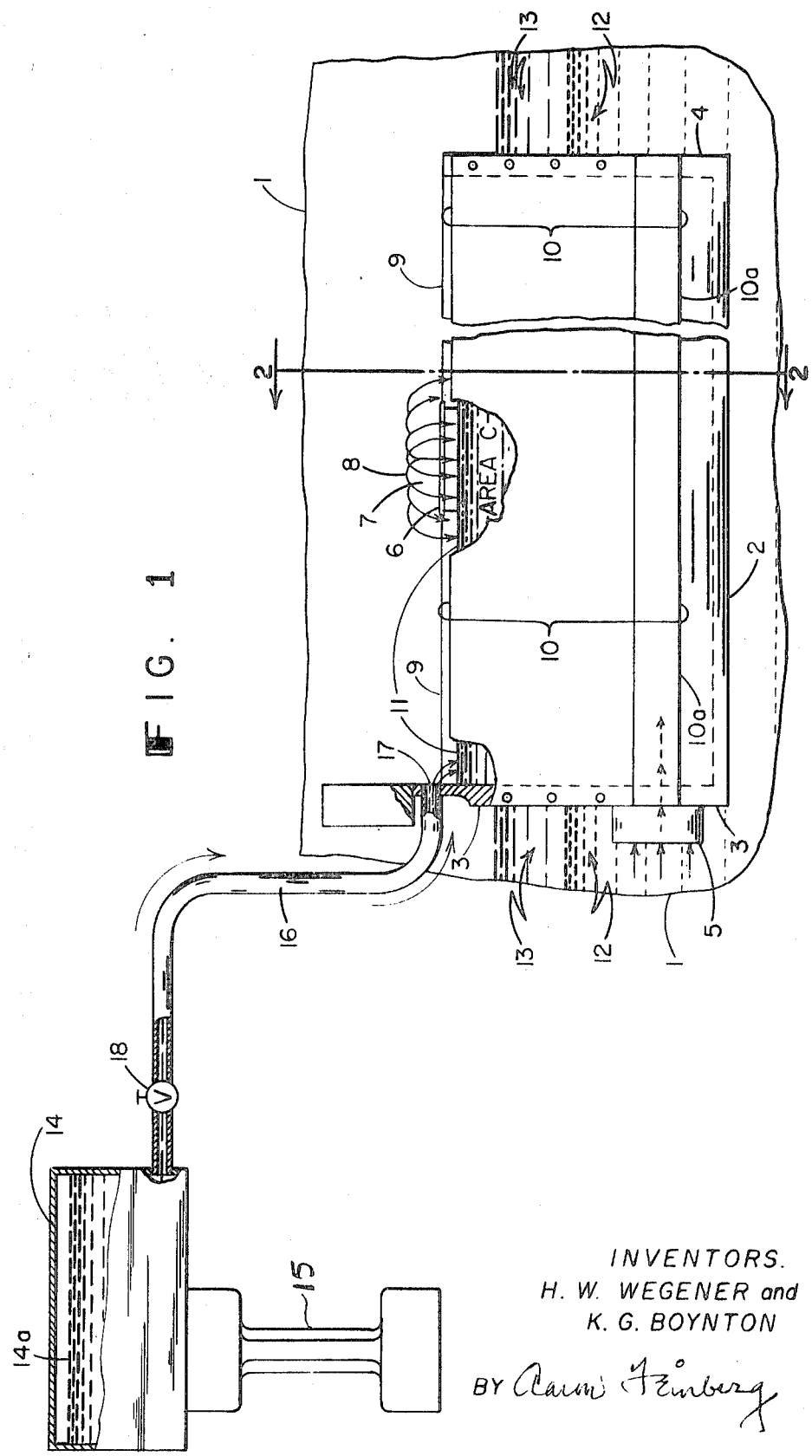
FIG. 1 is a side view of the sump of the machine, with certain parts removed and a side view of the blanketing oil reservoir, supply pipes and control valves.
Figure 2:
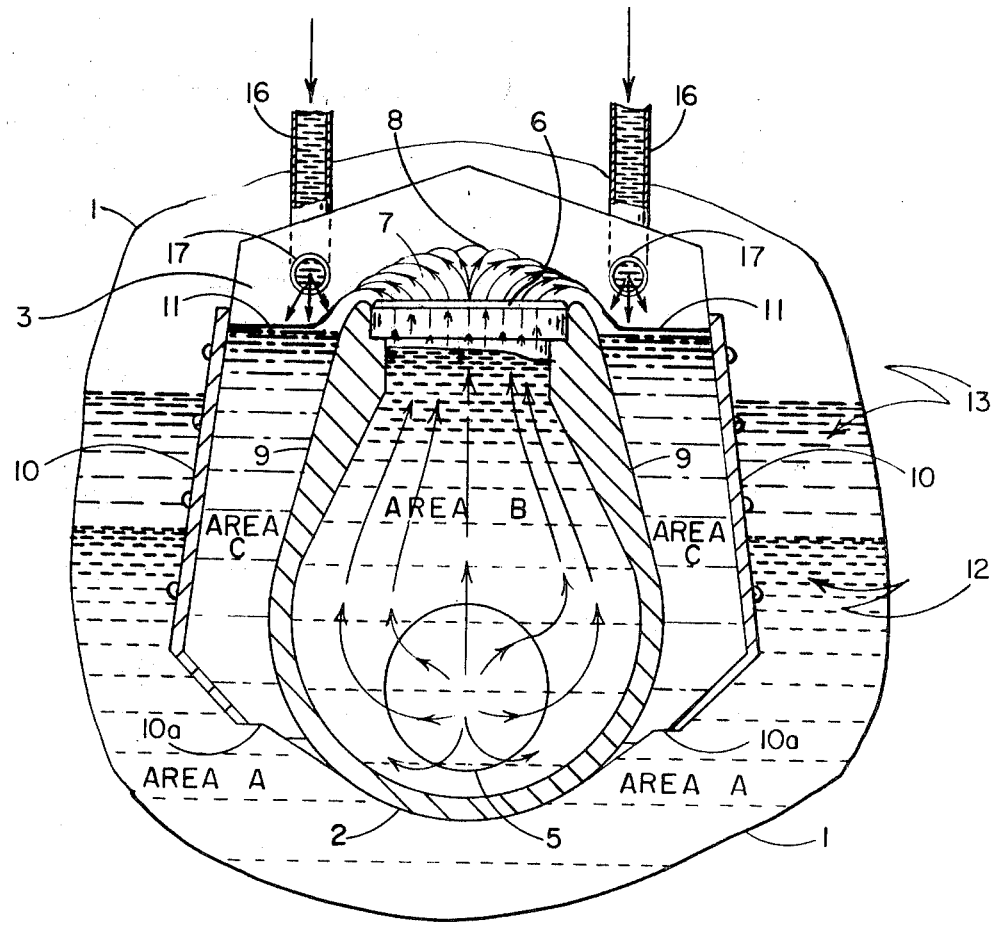
FIG. 2 is a transverse section taken on line 2—2 of FIG. 1.

The basic invention consists of a sump partially submerged in a main reservoir containing a bottom layer of molten solder with a layer of oil floating on top. The sump has an intake orifice connected to a pump which is adapted to force a mixture of solder and oil or solder alone into said orifice. The amount of oil introduced into the pump may, when required, be accurately regulated from shutoff to a flooding condition by means of a control mechanism.

The top of the sump forms a nozzle and is provided with a multiplicity of horizontal perforated screen positioned therein. On the exterior of both sides of the sump are sluice plates positioned from the sides of the the sump to form sluice areas with adjustable means to regulate the flow of the nozzle discharge from their lower discharge openings so that said areas are always full of solder.

Adjacent to the sump and positioned above it, is a novel added element of equipment consisting of an independent blanketing oil reservoir with connecting pipes extending downward from the lower portion of said reservoir and entering the sump through holes at the end of the sump nearer the pump orifice allowing a discharge of said oil into the area adjacent to and below the discharged wave on the top of the sluice areas. The said connecting pipes are provided with control valves to regulate the flow of oil from the blanketing oil reservoir to the sluice areas.

In typical operation, a solder and oil intermix or a flow of solder alone, depending on the type of soldering required, is pumped into the sump and out through the vertical nozzle. After contact with the objects to be soldered, the overflow then cascades over both sides of the nozzle and into the tops of said sluice areas and out through the bottoms of said areas.

When a mixture of solder and oil from the main reservoir is used, the oil from the supplementary blanketing oil reservoir is shut off, as the solder and oil mixture is sufficient to prevent the formation of dross on the top of said mixture in the sluice areas after discharge from the nozzle.

When solder alone is used, the supply of oil from the main reservoir having been shut off, harmful dross will form on the top of the overflow of discharged solder in the sluice areas. For this reason, after the soldering contact has been made, an auxiliary flow of oil is allowed to drip slowly onto the surface of the discharged solder as it reaches the tops of the two sluice areas adjacent to the sidewalls of the sump. The dross that would normally form and collect in these areas is thus blanketed by this oil. Such dross is absorbed by the oil and the blanket thus provided prevents such formation and accumulation.

The flow of heavy solder down the sluice areas draws the light blanketing oil from the two top surfaces down to the bottom of the sluices out into the solder in the main reservoir and from there it rises to the top of the main reservoir in which the sump is submerged to become a part of the layer of oil on the top of the main reservoir which acts as a common reservoir of solder and oil. A drain pipe is provided in the upper portion of the main reservoir to prevent a build up of the top oil layer.

Referring to the drawings, the soldering machine shown therein as illustrative of one embodiment of our invention comprises a solder pot or main reservoir 1 with a sump 2 partially submerged in the reservoir 1. The areas in reservoir 1 exterior to sump 2 are designated as areas A. The sump 2 has a near end 3 and a far end 4. The area within the sump 2 and between ends 3 and 4 is designated as area B. An intake orifice 5 is positioned in the end 3 of sump 2 and is connected by a pipe to a variable speed pump, said pump having associated control mechanism controlling the oil intake into the pump, which oil intake can be regulated from zero to flooding. The upper portion of sump 2 forms a nozzle 6 which extends from end 3 to end 4 and from which is discharged a wave 7 having a crest 8. Positioned from the outer walls 9 of sump 2 are sluice plates 10. The areas laterally extending between the outer walls 9 and the sluice plates 10 and lengthwise between ends 2 and 3 are designated as areas C. The top portions of areas C are shown at 11. The main reservoir area A contains a layer of solder 12 with a layer of oil 13 floating on top of the layer of oil 12. Supplementary blanketing oil reservoir 14, supported by bracket 15, is provided with blanketing oil pipes 16 which extend from the lower portion of the blanketing oil reservoir 14 to discharge orifices 17 positioned in the end 3 and above the crest portion 8 of wave 7. Regulating valves 18 are positioned in pipes 16 to control the supply of blanketing oil from zero to full discharge.

There are two operating conditions for the distribution and control of oil, solder alone, or an intermix of solder and oil viz.

1. When an intermix of solder and oil is used in the wave of the actual soldering operation as in U.S. Pat. No. 3,398,873. In this case the blanketing oil supply is completely shut off.

2. In the present invention, when solder alone is used in the actual soldering operation, the main supply of soldering oil is cut off from the pump and varying amounts of blanketing oil are added to the upper surfaces of the discharged solder wave after the soldering operation is completed and the discharged solder has reached the tops of the sluice areas in order to prevent and eliminate the formation and accumulation of dross on the top surfaces of the discharged solder positioned in the top of areas C.

This invention covers the latter type of operation, in which solder alone is pumped into area B through intake orifice 5. The solder is forced by the pump into area B in the sump and out vertically through the nozzle 6 forming a wave of solder 7 with a crest 8. The crest 8 makes contact with the objects to be soldered, then cascades over the sides of nozzle 6 and discharges onto the top of areas C. After such soldering contact, the tops of areas C containing the overflow from the discharged wave 7 is blanketed with oil from the supplementary oil reservoir 14 flowing down pipes 16 and out through orifices 17. The dross that would normally form and collect in the areas of 11 on top of the discharged wave is absorbed by this blanketing oil. The flow of heavy solder through areas C draws the oil from the surfaces 11 down to the bottom of sluice areas C and from there it flows into area A and rises to the top of the reservoir 1 to become a part of oil layer 13.

While the preferred embodiment of our invention has been described in detail, it will be understood that we do not wish to be limited to the particular construction set forth, since various changes in the form, materials, proportions and arrangement of parts and in the detail of construction may be resorted to without departure from the spirit and scope of the invention, or destroying any of the advantages contained in the same, heretofore described and defined in the following claims.

We claim:

1. In a mass soldering machine adapted to use a solder and oil intermix in the soldering contact or to use solder alone in the soldering contact and having a unit sump, vertical nozzle and exterior sluices and a circulating pump, said unit and pump being submerged in a main reservoir containing a bottom layer of solder with a layer of oil floating on said solder, said layer of oil and solder being adapted to supply said pump with oil and solder, said sluices being adapted to collect the overflow from both sides of said vertical nozzle, a supplementary oil reservoir containing blanketing oil, positioned adjacent to and above said unit and adapted to deposit oil on the top of said overflow from said nozzle after soldering contact.

2. A soldering machine as specified in claim 1 in which said oil supply from said top layer of floating oil in said main reservoir is adapted to be regulated from shutoff to flooding.

3. A soldering machine as specified in claim 1 in which said blanketing oil supply in said supplementary oil reservoir is adapted to be regulated from shutoff to flooding.

4. In a mass soldering machine producing a vertical wave with a horizontal crest, a combination sump, vertical nozzle, exterior overflow sluice areas and a circulating pump partially submerged in a main reservoir containing a layer of oil floating on a layer of solder, means for feeding and regulating the flow of oil from said main reservoir into said pump, means for collecting the overflow of said solder from said nozzle in designated sluice areas, means for feeding and depositing a regulated amount of blanketing oil on the upper surfaces of said overflow in said areas after the soldering contact is completed and means for returning said blanketing oil from said collecting areas to said floating layer of oil in said main reservoir, said return means comprising the drawing down in said sluice areas of the light blanketing oil by the flow of the heavy solder from the top surface of the solder in said areas after the soldering contact has been made to the bottom of said sluices and out into the solder in said main reservoir from which said light oil rises to the top of said floating layer of oil in said main reservoir.